(12) United States Patent
Martin et al.

(10) Patent No.: US 10,914,054 B2
(45) Date of Patent: Feb. 9, 2021

(54) SYSTEM AND METHOD FOR MEASUREMENT AND ABATEMENT OF COMPACTION AND EROSION OF SOIL COVERING BURIED PIPELINES

(71) Applicant: ModernAg, Inc., Wamego, KS (US)

(72) Inventors: Nicholas V. Martin, Wamego, KS (US); Larry N. Martin, Wamego, KS (US)

(73) Assignee: ModernAg, Inc., Wamego, KS (US)

( * ) Notice: Subject to any disclaimer, the term of this patent is extended or adjusted under 35 U.S.C. 154(b) by 42 days.

(21) Appl. No.: 16/182,048

(22) Filed: Nov. 6, 2018

(65) Prior Publication Data

US 2019/0136491 A1    May 9, 2019

Related U.S. Application Data

(60) Provisional application No. 62/582,699, filed on Nov. 7, 2017.

(51) Int. Cl.

| | |
|---|---|
| *E02F 9/26* | (2006.01) |
| *E02F 5/22* | (2006.01) |
| *G01B 5/18* | (2006.01) |
| *G01S 19/14* | (2010.01) |
| *G01C 7/02* | (2006.01) |
| *G01B 3/28* | (2006.01) |

(52) U.S. Cl.
CPC .............. *E02F 9/261* (2013.01); *E02F 5/223* (2013.01); *G01B 3/28* (2013.01); *G01B 5/18* (2013.01); *G01C 7/02* (2013.01); *G01S 19/14* (2013.01)

(58) Field of Classification Search
CPC .... F16L 1/11; G01B 3/28; G01B 5/18; G01C 7/02; G01C 15/06
See application file for complete search history.

(56) References Cited

U.S. PATENT DOCUMENTS

| | | | | |
|---|---|---|---|---|
| 4,806,153 A | * | 2/1989 | Sakai et al. .............. | E21B 47/26 73/152.52 |
| 5,644,237 A | * | 7/1997 | Eslambolchi et al. ... | G01V 3/02 324/326 |
| 6,326,790 B1 | * | 12/2001 | Ott et al. .................. | G01V 3/15 324/236 |
| 6,502,321 B1 | * | 1/2003 | Crain et al. ............ | G01C 15/06 33/296 |
| 6,688,012 B1 | * | 2/2004 | Crain et al. ............ | G01C 15/06 33/295 |
| 6,768,959 B2 | | 7/2004 | Ignagni | |

(Continued)

*Primary Examiner* — Tara Mayo-Pinnock
(74) *Attorney, Agent, or Firm* — Erickson Kernell IP, LLC; Mark C. Young

(57) ABSTRACT

A system for measuring the depth and location of a buried pipeline includes a probe having a GPS receiver, an elevation sensor, and a removable tablet computer for capturing data corresponding to the position and elevation of an underground pipeline and the corresponding soil surface covering the pipeline. Collected data is aggregated at a central computer which produces topographical maps of the pipeline's current relationship to the soil and calculates a desired soil covering. The calculated amount and placement of soil to achieve a desired end topography is used in abatement of any soil erosion or compaction. In alternative embodiments the required soil for abatement is transmitted to earth moving equipment.

15 Claims, 9 Drawing Sheets

(56) References Cited

U.S. PATENT DOCUMENTS

| | | |
|---|---|---|
| 6,853,909 B2 | 2/2005 | Scherzinger |
| 7,254,485 B2 | 8/2007 | Rooney et al. |
| 7,889,124 B2 | 2/2011 | Islam et al. |
| 8,000,936 B2 | 8/2011 | Davis |
| 8,416,130 B2 | 4/2013 | Scherzinger |
| 8,547,247 B1 * | 10/2013 | Haddy ............... G01V 3/15 |
| | | 340/870.21 |
| 8,938,366 B2 | 1/2015 | Nielsen et al. |
| 9,182,229 B2 * | 11/2015 | Grasser et al. ........ G01C 15/00 |
| 9,188,440 B2 | 11/2015 | Carlson et al. |
| 9,247,239 B2 * | 1/2016 | He et al. .............. H04N 13/296 |
| 9,360,588 B2 | 6/2016 | Young et al. |
| 9,541,392 B2 | 1/2017 | Dusha |
| 9,746,572 B2 * | 8/2017 | Olsson et al. ........... G01V 3/15 |
| 2000/5001036 | 1/2005 | Runkel et al. |
| 2008/0180319 A1 * | 7/2008 | Islam et al. ............ G01C 15/00 |
| | | 342/357.48 |
| 2009/0024325 A1 | 1/2009 | Scherzinger |
| 2015/0056369 A1 | 2/2015 | Kohn |
| 2015/0276402 A1 * | 10/2015 | Grasser et al. ........ G01C 15/06 |
| | | 702/150 |
| 2016/0003792 A1 | 1/2016 | Owens et al. |
| 2016/0275211 A1 | 9/2016 | Shuler et al. |

\* cited by examiner

| North Pipeline | 1 | 2 | 3 | 4 | 5 | 6 | 7 | 8 | 9 | 10 | 11 | 12 | | Total FT | NRCS EST Cost/ft | Total |
|---|---|---|---|---|---|---|---|---|---|---|---|---|---|---|---|---|
| Normal Gradiant Terrace Length | 792 | 415 | 0 | 0 | 0 | 0 | 0 | 0 | 0 | 870 | 824 | 615 | | 3516 | $1.55 | $5,449.80 |
| Storage Terrace Length | 0 | 0 | 386 | 0 | 635 | 757 | 93 | 93 | 93 | 870 | 0 | 0 | | 2927 | $1.91 | $5,590.57 |
| 6-10" pipe | 1359 | | | | | | | | | | | | | 1359 | $14.55 | $19,773.45 |
| | | | | | | | | | | | | | CYD | | cost / CYD | |
| Dirt fill over pipe | | | | | | | | | | | | | 1.5 ft OP | 130 | $3.00 | $390.00 |
| | | | | | | | | | | | | 2.0 ft OP | 473 | $3.00 | $1,419.00 |
| | | | | | | | | | | | | | | | | $32,622.82 |
| | | | | | | | | | | | | | | | | |
| Middle Pipeline | 1 | 2 | 3 | 4 | 5 | 6 | 7 | 8 | 9 | 10 | 11 | 12 | | Total FT | NRCS EST Cost/ft | Total |
| Normal Gradiant Terrace Length | 792 | 415 | 0 | 0 | 0 | 0 | 0 | 0 | 0 | 870 | 824 | 615 | | 3516 | $1.55 | $5,449.80 |
| Storage Terrace Length | 0 | 0 | 152 | 0 | 635 | 362 | 373 | 298 | 337 | 425 | 0 | 0 | | 2582 | $1.91 | $4,931.62 |
| 6-10" pipe | 1374 | | | | | | | | | | | | | 1374 | $14.55 | $19,991.70 |
| | | | | | | | | | | | | | CYD | | cost / CYD | |
| Dirt fill over pipe | | | | | | | | | | | | | 1.5 ft OP | 130 | $3.00 | $390.00 |
| | | | | | | | | | | | | 2.0 ft OP | 473 | $3.00 | $1,419.00 |
| | | | | | | | | | | | | | | | | $32,182.12 |
| | | | | | | | | | | | | | | | | |
| Plus cost of leveling old terraces | | | | | | | | | | | | | | 6 | $150.00 | $900.00 |

FIG. 7

SYSTEM AND METHOD FOR MEASUREMENT AND ABATEMENT OF COMPACTION AND EROSION OF SOIL COVERING BURIED PIPELINES

CROSS-REFERENCE TO RELATED APPLICATIONS

This application claims the benefit of U.S. Provisional Patent Application No. 62/582,699, filed Nov. 7, 2017, the disclosure of which is hereby incorporated herein in its entirety by reference.

BACKGROUND

Underground pipelines for transporting natural gas, water, oil, and other fluid commodities, and underground conduits for carrying electrical and communications cables are well known in the art. In a typical installation of such a utility pipeline a trench is dug in the soil, the pipeline or conduit is placed in the trench, and soil is backfilled into the trench to cover the pipe so that the pipeline is under ground, with the ground above thus usable without obstruction by the pipeline.

However, because the soil backfilled into the trench is relatively loose, it is common for the replaced soil to compact and settle, or to erode over time, thus leaving less soil over the buried pipeline or conduit than desired, and/or leaving the pipeline at depth below the ground's surface less than required to meet safety requirements or regulations.

Known methods of detecting and correcting such compaction are time and labor intensive, and often rely on estimates and visual indications of problems and remediation. For example, conventional surveys of compacted areas may detect some variations in soil levels, but do not provide detection of the physical pipes underneath the ground, thus any compaction or deficiency of soil is usually estimated. Likewise, remediation often involves adding an estimated amount of soil to fill and cover the area based primarily on visual indications of establishing a level or congruous site.

Thus, it can be seen that there remains a need in the art for a system and method to measure the depth of the pipeline beneath the ground's surface and to accurately and efficiently provide for the correction of any deficiencies.

SUMMARY

Embodiments of the invention are defined by the claims below, not this summary. A high-level overview of various aspects of the invention is provided here to introduce a selection of concepts that are further described in the detailed description section below. This summary is not intended to identify key features or essential features of the claimed subject matter, nor is it intended to be used in isolation to determine the scope of the claimed subject matter. In brief, this disclosure describes a system and method for determining the depth of a pipeline beneath the surface level of covering ground soil, and for determining and implementing corrective soil replacement measures.

In one aspect, the system includes a probe having sensors or receivers operable to capture data corresponding to a geographic position of the probe (i.e., GPS data) and an elevation of the probe. The probe is used to capture data corresponding to the position and elevation of a buried pipeline as well as the position and elevation of the surface of the ground soil covering the pipe. Position and elevation data is transmitted from the sensors via a hardwired connection to a data collection device, such as a tablet computer, attached to a support stand on the probe. The collected data is stored on the tablet device for later mapping and analysis, or for transfer to a central computer system for mapping and analysis.

In a typical use of the probe, a user walks along the surface of the ground covering the pipeline, following the pathway of the pipeline based on pre-existing maps or other information indicating the location of the pipeline. During a first traversal of the path, and at intervals along the path of the pipeline, the tip of the soil probe is inserted into the ground until contact with the pipeline. The user then triggers the capture of a data point comprising the positional (i.e., GPS coordinates) and elevational data corresponding to the probe's current position—i.e., coordinates and elevation of the pipeline beneath the soil's surface. In one embodiment a switch or sensor on the tip of the probe triggers the data capture, in other embodiments, the user can instigate data capture by pressing a button on the laptop computer or by activating a switch on the probe.

After obtaining pipeline positional and elevational data, the user then traverses the same path again, placing the tip of the probe at the ground's surface and capturing data points corresponding to the position and elevation of the ground's surface at the same intervals previously used to capture the pipe depth. Thus, traversing the path twice, the user first captures data points indicating to the pipeline's position and elevation, and then captures corresponding data points indicating the ground surface position and elevation. Each set of corresponding data points can thus be used to determine the depth of the pipeline beneath the soil at that particular point.

In another aspect of the present invention, the captured positional and elevational data for the pipeline and ground surface is processed and analyzed and to create a topographical map of the soil depth covering the pipeline along the surveyed path, and, in exemplary embodiments, generating a cross sectional view of the buried pipeline in relation to the ground level at any desired point along the path.

With the depth of soil covering the pipeline determined, a desired soil depth along the path is used to determine the amount and placement of soil needed to restore the proper soil depth over the pipeline along the length of the surveyed path to achieve a desired pipeline depth, desired slope or water drainage, or other desired parameters. In further embodiments, the coordinates for placement of replacement fill soil are transmitted to vehicles or earthmoving equipment for precise and efficient placement of soil to restore the pipeline to its desired depth.

DESCRIPTION OF THE DRAWINGS

Illustrative embodiments of the invention are described in detail below with reference to the attached drawing figures, and wherein:

FIGS. 7 and 8 are screen shots of a calculation utility for determining the amount and cost of fill dirt to achieve a desired terrain profile in accordance with an exemplary embodiment of the present invention.

DETAILED DESCRIPTION

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" as used herein denote deviations from the exact value in the form of changes or deviations that are insignificant to the function.

Figure 1:
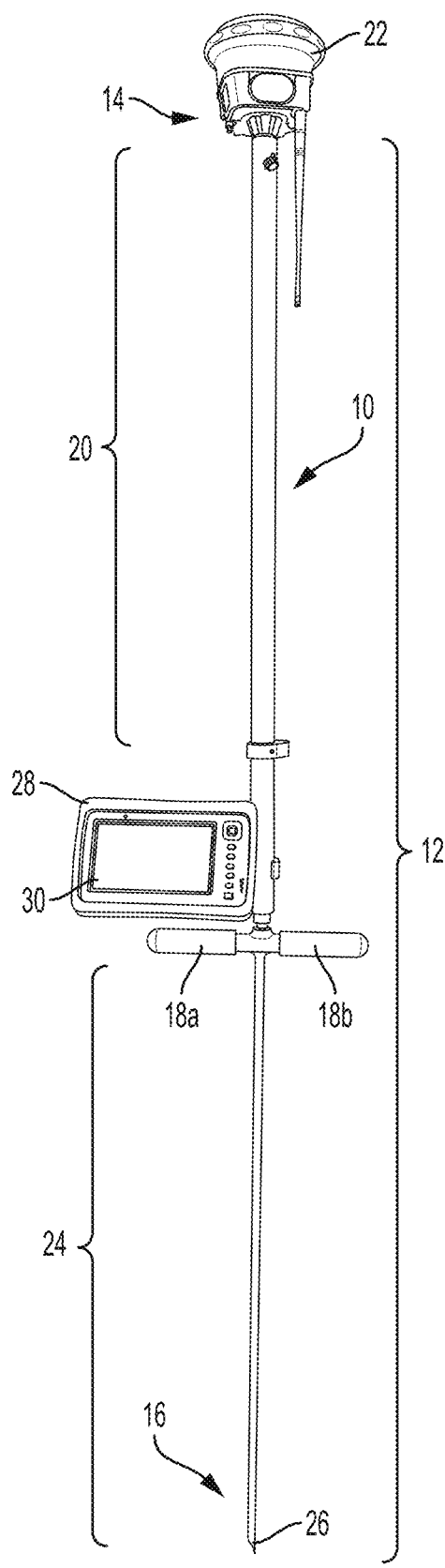
FIG. 1 is a front view of a positional and elevational soil probe in accordance with an exemplary embodiment of the present invention.
Figure 2:
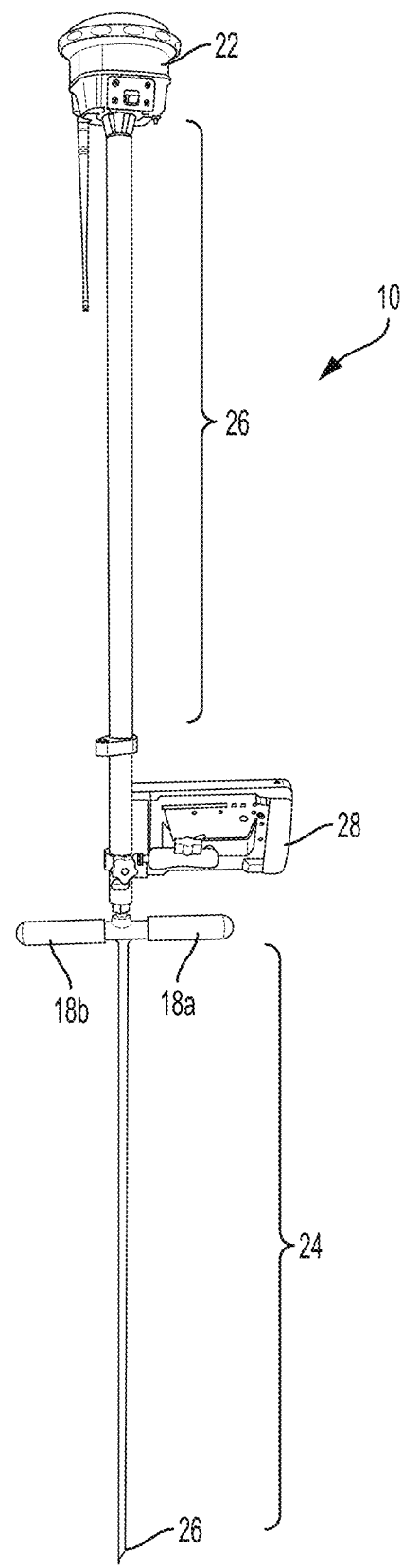
FIG. 2 is a rear view of the soil probe of FIG. 1.

Looking first to FIGS. 1 and 2, a data collection probe 10 in accordance with an exemplary embodiment of the present invention comprises an elongated center tower 12 extending between upper 14 and lower ends 16, with handles 18a, 18b for carrying and placing the probe portion extending outwardly from each side, perpendicular to the center tower 12.

The upper portion 20 of the center tower 12 is a generally cylindrical tube, extending upwardly from the handles 18a, 18b, with a GPS receiver 22 positioned at the top end of the upper portion 20. As is known in the art, the GPS receiver is operable to receive signals from satellites in geosynchronous orbit above the earth and to calculate the position of the receiver based on those received signals. Thus, with the GPS receiver 22 placed at the top end of the upper portion 20 of the soil probe 10 the geographic position of the probe is determined by the GPS receiver 22.

Preferably, the GPS receiver 22 includes capability to provide elevation data, or includes a separate sensor to provide elevation data so that in addition to determining the position of the probe, the elevation is likewise determined.

The lower portion 24 of the center tower 12 is a generally cylindrical rod, extending downwardly from the handles 18a, 18b and terminating in a pointed lower end 26. The lower end 26 of the lower portion 24 allows the probe to be inserted into the ground to determine the location of a buried pipeline to allow the capture of GPS and elevational data corresponding to pipeline's location, the lower end 26 may also be placed on the ground surface at a desired location to capture GPS and elevational data corresponding to that soil surface placement location.

A support bracket and computer device holder 28 is attached to, and extends horizontally outwardly from, the upper portion 20 of the center tower 12, just above the handles 18a, 18b. The device holder secures a tablet computer 30 or other smart device to the probe 10, preferably positioned so that the screen of the tablet computer 30 is oriented towards a user grasping the handles 18a, 18b. Thus, a user holding the device by the handles can see the screen of the tablet computer 30 to receive information from the computer and/or to allow the user to enter data or make selections on the computer.

In an exemplary use, a user of the probe 10 seeking to obtain measurements of the elevation of soil covering a buried pipeline is provided with a map showing the pathway of an underground pipeline. Preferably, the map information is stored on the computer 30 and is presented to the user via the display of the computer. Alternatively, the user may rely on a printed map, landmarks, or other information establishing the pathway of the buried pipeline. Using the probe 10, and grasping and carrying the probe by the handles 18a, 18b, the user walks the ground surface along the pathway of the buried pipeline. At intervals along the pathway, the user stops and places the tip of the probe 10 on the ground and captures the position (GPS coordinates) and elevation of the ground surface at that point. Preferably, data points are collected at regular intervals along the pathway, such as every 50 feet, or other desired interval. Most preferably, the computer 30 prompts the user to stop and collect data at those regular intervals based on map data stored in the computer and/or based on GPS coordinates from the GPS receiver 20. As discussed above, data points may be collected by command from the user (e.g., the user presses a button or display on the computer 30) or presses a physical switch on the device. In alternative embodiments, the collection of data points may be instigated by a switch on the tip of the probe 10, or by other switches or sensors on the probe detecting the placement of the probe onto the ground surface or by sensing other characteristics of the probe such as movement or vertical orientation.

Regardless of the triggering means, collected data points, preferably including GPS coordinates and elevation, are captured and stored on the computer device 30 for later review, analysis, or retrieval as will described in more detail below. Upon completion of collection of data points along the entire pathway of the underground pipeline, or along a desired segment of the underground pipeline, the user removes the computer 30 from the probe 10 for later access, retrieval, and analysis of the collected data points.

In alternative methods of using the probe, the user may take multiple readings and capture multiple data points from the same locations. For example, the user may traverse the pathway a first time, collecting data points at 50 foot intervals along the way, and then repeat that same pathway traversal, obtaining second data points for each location along the way. The duplicate data points can be used to verify the integrity of the captured data. In other alternatives, the user may backtrack along the pathway, capturing second data points along the way. Various other schemes for capturing additional and/or redundant data points along the pathway are within the scope of the present invention.

With the probe and data collection as just described, turning to FIGS. 3 through 6 a method of using the collected data to determine pipeline depth and soil replacement and re-terraforming will now be described with reference back to the soil probe described in FIGS. 1 and 2.

In use to measure the depth of buried pipeline and abate the erosion or compaction of soil surrounding the pipeline, a user of the probe 10 will initially attach a tablet computer 30 to the probe and, grasping the handles 18a, 18b of the probe, will traverse a path along the buried pipeline, or a section of the buried pipeline. At intervals along the path of the pipeline, for example, at fifty-foot intervals, the user places the probe on the ground above the pipeline and presses the probe into the soil into the earth until the tip of the probe contacts the upper surface of the buried pipeline. Upon contact, the user captures GPS and elevation data at that point. The probe is then pulled out of the soil, and the user continues along the path to the next point—i.e., the next fifty-foot interval. As described above, the GPS and elevational data collected at each point is stored on the tablet computer device 30.

After traversing the pipeline path and collecting points corresponding to the pipeline elevation and position, the user preferably repeats the same path, this time collecting data from the soil surface at the same points where he or she previously collected pipeline data. Thus, upon completion of the second traversal of the pipeline path, the user has collected data corresponding to the pipeline elevation and the soil elevation at multiple corresponding GPS positions along the pipeline. With the data thus collected, the user may similarly collect data from additional pipeline segments as required.

Figure 9:
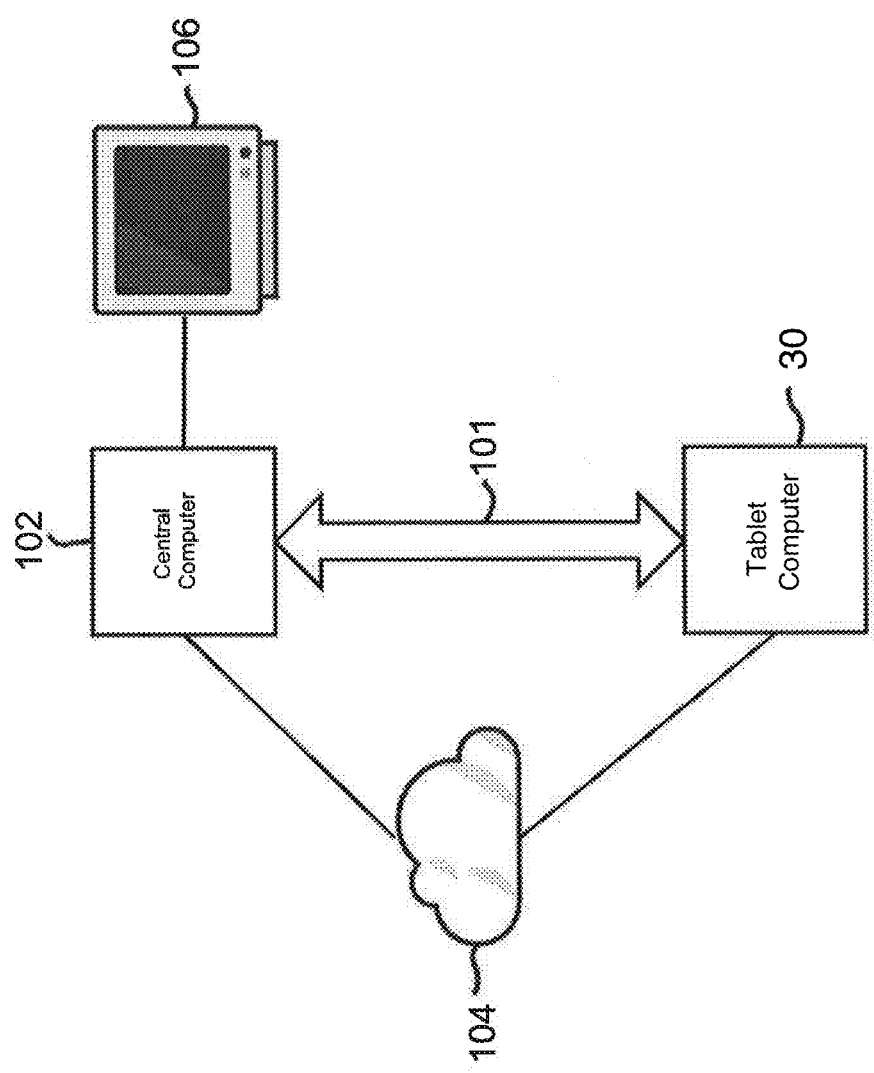
FIG. 9 is a block diagram of a system in accordance with an exemplary embodiment of the present invention.

Turning to FIG. 9, upon completion of data collection, the tablet computer 30 is taken to a central location where the data collected is transferred to a central computer 102 via a direct link 101 or over a network 104 connection, as is known in the art. With one or more monitors 106 or workstations connected in communication with the central computer 102, the collected data is processed and remedial measures are determined for each pipeline and/or pipeline segment as follows.

Figure 4:
FIG. 4 is a screen shot of a topographical map of pipeline depth of a buried pipeline after soil replacement in accordance with an exemplary embodiment of the present invention.

As seen in FIG. 4, the data for a particular pipeline or pipeline segment is processed and plotted with a topographical map showing the pipeline's location and elevation displayed on a user's computer screen. With the elevation of the pipeline and the surface of the soil information collected, the depth of the pipeline along the length of the measured segment is calculated and displayed.

Figure 3:
FIG. 3 is a screen shot of a topographical map of pipeline depth along the pathway of a buried pipeline prior to soil replacement in accordance with an exemplary embodiment of the present invention.

Based on the topographical map and with input from the user describing a desired soil level, and/or a desired drainage pattern, as seen in FIG. 3, the central computer calculates and displays a desired soil level on a topographical map display. Based on the actual soil surface elevation as measured by a user, and on a desired soil elevation calculated by the central computer in conjunction with user input as to a desired soil elevation. The system can calculate the amount of soil required to achieve the desired topography (i.e., the desired soil elevation over the buried pipeline and/or the desired slope and drainage of the soil surface after abatement).

Using the GPS coordinates and soil amount and placement data provided by the system, soil can be transported to the pipeline site and distributed in accordance with the topographical map to achieve the desired soil level over the buried pipeline.

In alternative embodiments, the desired soil placement amounts and positioning or location is transmitted directly to earthmoving equipment to ensure that the soil is accurately distributed according to the desired plan or map.

In further embodiments, once the soil abatement has been completed, a user may once again traverse the pipeline path to collect additional soil surface measurements to ensure that the soil abatement was accomplished as desired.

Figure 5:
FIG. 5 is a screen shot of a topographical map of elevations of terraced soil in the area of buried pipelines in accordance with an exemplary embodiment of the present invention.
Figure 6:
FIG. 6 is a screen shot of a topographical map of elevations of terraced soil in the area of buried pipelines in accordance with an exemplary embodiment of the present invention.

FIGS. 5 and 6 depict multiple pipelines and pipeline segments on a topographical map. As described above, the data collection probe may be used to collect data from a single pipeline or pipeline segment or may be used to collect data from multiple pipelines or segments with the data stored on the tablet computer for eventual transfer to a central computer for analysis and mapping.

FIG. 7 depicts a calculation spreadsheet used in the determination of the amount and cost of soil needed to achieve a desired profile of terrain over the buried pipeline.

With the structure of the data collection probe and processing center set forth, and exemplary usage of the system and method of the present description will now be described with reference back to FIGS. 1 through 9 as necessary.

In an exemplary usage of the system and method of the present invention, a user of the system receives a request for service for potential measurement and abatement of compacted or eroded soil from a landowner, utility company, or other interested party.

Upon receipt of the request an evaluation of the property is performed, including, but not limited to, acquisition of a legal description of the property, acquisition of information about the property from various sources, such as Google Maps and Bing maps, and any aerial or LIDAR (light detection and ranging) imagery that exists in available databases, information from NRCS (Natural Resources Conservation Service), and any other photos or information available, such as from the land owner, with respect to drainage issues, drainage points, and the like.

The acquired information is analyzed for preliminary identification of drainage issues to be addressed and potential solutions, as well as a survey of the land using the system and method of the present invention.

A survey of the land begins with notification of the 811 system to request a design location for the land to be surveyed. A visual location of the land is performed to verify the veracity of the initial evaluation.

Preferably, a real-time kinematic (RTK) base station is established at a location free of trees, structures, or other obstructions that could affect the performance of the system. A survey system, such as a Trimble WM Topo survey system is set up at the site and a name for the land or field is entered for the subsequent collection of data. Most preferably, a master benchmark and multiple additional benchmarks are set to ensure data integrity in the event the master benchmark is destroyed. Preferably, at least three benchmark locations that can be used to register aerial imagery for reference use during the design process are established. A working benchmark is preferably set in a location accessible by survey and construction equipment for re-benchmarking purposes.

Using the probe 12 of the present invention, data points (locations) are first measured at each of the utility flags placed by utility companies as part of the 811 safety survey. In a manner similar to that described above, the probe 12 is used to measure points and gather data at intervals along the buried pipeline. Preferably, a flag is placed at each survey point, with the measured probe depth recorded on the flag. The survey process is then repeated for any additional buried pipelines encompassed by the remediation solution. The collected data file having the field name is then preferably stored and copied to an external storage device.

The process is then repeated, in a manner as described above, with the probe taken to the same points previously measured. Preferably, the new pipeline depth measurements are compared and verified against the previous data points recorded on the flags as previously described. Once verified, the corroborating data file is similarly stored and transferred to an external storage device.

With the original and corroborating data files having pipeline data collected, boundary and interior survey points are collected in a similar manner, and likewise recorded and stored.

With reference to FIGS. 3 through 8, with the data collected, the data is processed in a manner similar to that described above and a remedial solution is designed by mapping the collected data on imagery of the surveyed land parcel. The measured surface layers of the top of the pipe, the surface over the pipe, and the complete survey are displayed using mapping techniques known for combining and correlating imagery and location data points.

Figure 8:
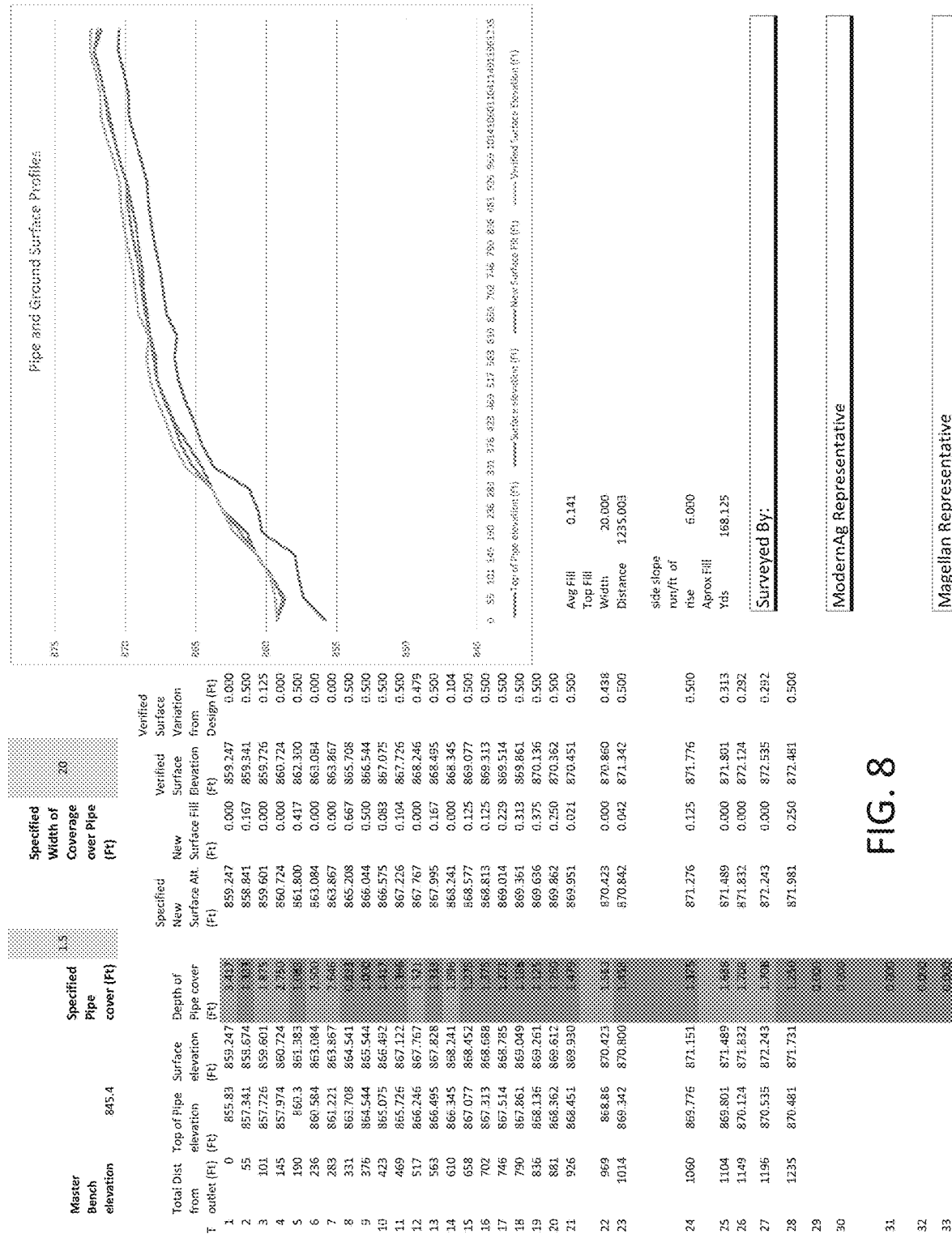

With the survey information collected, stored, and displayed, a pipeline profile calculator, as depicted in FIGS. 7 and 8 is used to calculate amounts and costs of remedial fill based on the survey data and a desired depth and width of fill above the pipeline(s), using data relating to the top of pipe, field level, surface over pipe, pipe elevation profile, surface elevation, and other data points and information. Preferably, fill levels and amounts of fill for each of a plurality of points distributed throughout the site are calculated to provide for a desired level of fill when implemented.

Similarly, drainage layers are planned using the mapping and calculating tools as depicted in the figures and as described above. The steps above are repeated for each of the pipelines and drainage solutions in the area to be remediated. Once designs are completed, they are exported and uploaded for further verification.

With the design of proposed remedial fill completed, the remediation is implemented by returning to the site. A visual inspection and base location are established in a manner similar to that previously described. The master benchmark is located and re-established, as well as additional benchmarks and the working benchmark.

Using the design established in the calculation steps above, fill is added to the points along the pipeline, with the probe 12 used to re-establish those points in a manner as previously described. As the fill is added and distributed, the amounts of fill, elevations, etc. are preferably verified as the implementation proceeds to ensure that the appropriate and calculated amounts of fill are being provided, and the that fill is achieving the desired results as calculated.

With the implementation of the remedial fill completed, the completion is verified by performing a verification survey in a manner similar to that described above.

Using the probe 12 of the present invention, verification data points (locations) are measured at data points at intervals along the buried pipeline. Preferably, a flag is placed at each survey point, with the measured probe depth recorded on the flag. The survey process is then repeated for any additional buried pipelines encompassed by the remediation solution. The collected verification data file having a field name is then preferably stored and copied to an external storage device.

The verification data points are compared to the initially gathered data points to ensure that fill has been added and that a desired fill depth has been achieved, and to ensure that the desired drainage elevations have been established.

From the above, it can be seen that the system and method of the present invention is well suited for measuring the depth of a pipeline beneath the surface of the soil, and for determining the amount and placement of soil to achieve a desired topography of soil over the buried pipeline.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A system for measuring underground pipeline depth and abating soil compaction and erosion, comprising:
   a soil probe comprising a GPS receiver and an elevation sensor, the soil probe configured for penetration into the ground until contact with an underground pipeline and operable to capture a first set of data comprising a depth of the underground pipeline at a first set of one or more points along the underground pipeline, and further configured for placement on the ground along a surface pathway of the underground pipeline and operable to capture a second set of data comprising a surface elevation at a second set of more or more points along the pathway corresponding to the first set of one or more points;
   a removable computer device removably attached to the soil probe and in communication with the GPS receiver and the elevation sensor, the computer device operable to receive and store data received from the GPS receiver and the elevation sensor;
   a central computer system operable to communicate with and receive data from the computer device, the central computer system further operable to:
   aggregate and accumulate data from the removable computer device;
   create and display a topographical map of GPS and elevation data relating to one or more pipelines based on the first and second sets of captured data;
   calculate a desired soil topography for relating to one or more pipelines and display a topographical map depicting the desired soil topography; and
   calculate a required amount of soil and a placement of the soil to achieve the desired soil topography.

2. The system of claim 1, wherein the central computer is further operable to display a cross-sectional view of a pipeline and soil topography along one or more points on a pipeline path.

3. The system of claim 1, wherein the GPS is positioned at a top end of the soil probe.

4. The system of claim 1, wherein the captured data comprises GPS coordinates, elevation, and combinations thereof.

5. The system of claim 1, wherein the soil probe further comprises a plurality of handles positioned near a center portion.

6. The system of claim 1, wherein a lower end of the soil probe comprises a sharp end configured to penetrate soil to locate a position of a buried pipeline.

7. A method for abating soil compaction or system for measuring underground pipeline depth and abating soil compaction and erosion, comprising:
   inserting a soil probe into the ground until contact with an underground pipeline and obtaining GPS and elevation data for a plurality of points along the upper surface of the buried pipeline, the data corresponding to position and elevation of the pipeline;

placing a soil probe on a surface above the underground pipeline and obtaining GPS and elevation data for a plurality of points along the surface of soil covering the buried pipeline, the data corresponding to the position and elevation of the soil surface covering the pipeline;

creating and displaying a topographical map of GPS and elevation data relating to position of the buried pipeline in relationship to the soil surface;

calculating a desired soil topography of the pipeline and displaying a topographical map depicting the desired soil topography; and calculating a required amount of soil and a placement of the soil to achieve the desired soil topography.

8. The method of claim 7, further comprising: transmitting a required amount of soil and soil placement to at least one earthmoving vehicle.

9. The method of claim 7, further comprising:

obtaining corroborating GPS and elevation data for a plurality of points along the upper surface of a buried pipeline, the data corresponding to position and elevation of the pipeline; and obtaining corroborating GPS and elevation data for a plurality of points along the surface of soil covering a buried pipeline, the data corresponding to the position and elevation of the soil surface covering the pipeline.

10. The method of claim 7, further comprising:

distributing fill material based on the calculated required amount of soil to achieve the desired topography.

11. The method of claim 10, further comprising:

obtaining verification data to verify that distributed fill material achieved a desired result.

12. A method for abating soil compaction or system for measuring underground pipeline depth and abating soil compaction and erosion, comprising:

obtaining GPS and elevation data for a plurality of points along a buried pipeline and a plurality of points along a pathway on a surface of soil covering the buried pipeline using a soil probe comprising:

a GPS receiver and an elevation sensor, the soil probe operable to capture data at one or more points along a path of the underground pipeline; and a removable computer device removably attached to the soil probe and in communication with the GPS receiver and the elevation sensor, the computer operable to receive and store data received from the GPS receiver and the elevation sensor;

the data corresponding to position and elevation of the pipeline;

obtaining GPS and elevation data for a plurality of points along the surface of soil covering a buried pipeline, the data corresponding to the position and elevation of the soil surface covering the pipeline; and calculating a required amount of soil and a placement of the soil to achieve a desired soil topography.

13. The method of claim 12, further comprising:

creating and displaying a topographical map of GPS and elevation data relating to position of the buried pipeline in relationship to the soil surface.

14. The method of claim 12, further comprising:

calculating a desired soil topography of the pipeline and displaying a topographical map depicting the desired soil topography.

15. The method of claim 12, further comprising:

transmitting a required amount of soil and soil placement to at least one earthmoving vehicle.

* * * * *